July 12, 1938.　　　M. P. YOUKER　　　2,123,821
PROCESS FOR FRACTIONALLY DISTILLING HYDROCARBON LIQUIDS
Filed Nov. 28, 1932
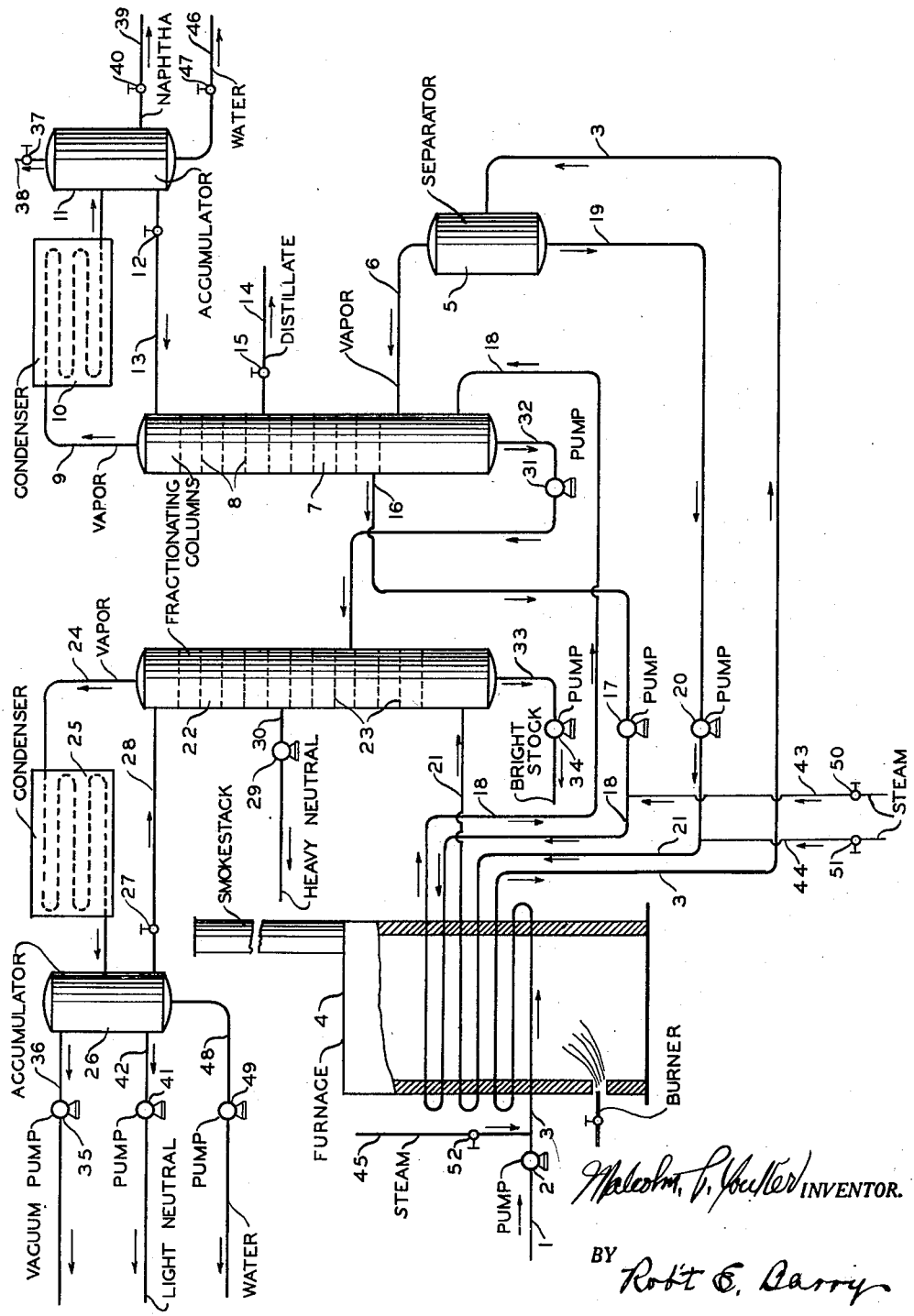

Patented July 12, 1938

2,123,821

UNITED STATES PATENT OFFICE 2,123,821

PROCESS FOR FRACTIONALLY DISTILLING HYDROCARBON LIQUIDS

Malcolm P. Youker, Bartlesville, Okla., assignor to Phillips Petroleum Company, Bartlesville, Okla., a corporation of Delaware Application November 28, 1932, Serial No. 644,721

8 Claims. (Cl. 196—73)

My new improvement pertains particularly to the separating into fractions a mixture formed by mixing lubricating oil with light petroleum distillate, the process being at least partially carried out under sub-atmospheric pressure to thus maintain low distillation temperatures. The process may be advantageously used to separate other hydrocarbon liquids into desired fractions. An object of my new process is the obtainment of sharp fractionation between the fractions produced. Another object of my new process is to separate petroleum liquids into fractions at minimum temperatures, thus avoiding the detrimental effect of cracking in the manufacture of lubricating oils. Other objects of my new process will be made apparent in the following specification.

The improvements which are set forth herein are largely a particular combination of improvements which were originally disclosed in applications for United States patent made by the present applicant under the following dates and United States Patent Office Serial Numbers: 431,291, filed February 25, 1930 and 592,614, filed February 12, 1932, now U. S. Patent 2,035,209.

My new process will be understood from the following description taken in connection with the attached drawing on which a form of apparatus by which my new process may be carried out is illustrated in side elevation.

A mixture of hydrocarbon liquids which has been formed by mixing lubricating oil with light petroleum distillate for the purpose of facilitating the dewaxing or other treatment of such lubricating oil will be delivered through pipe 1 to pump 2 and thence by means of pump 2 through the tube 3 which passes through the furnace 4 and enters the vapor liquid separator 5. The material so passed through tube 3 and furnace 4 is heated in passage through the furnace 4 to a temperature such that practically all of said light hydrocarbon distillate and a portion of the said lubricating oil will be vaporized therein and said material will be then delivered into separator 5 in the form of a mixture of vapor and liquid. Vapor which enters separator 5 will flow thence through pipe 6 into fractionating column 7 and thence upward through fractionating column 7 and bubble trays 8 which are disposed within fractionating column 7 and thence through pipe 9 and a condenser 10 into accumulator tank 11. Vapor which passes through the pipe 9 and the condenser 10 will be condensed therein and will flow in the liquid state into the accumulator 11. Liquid which will collect in the accumulator 11 will, through manipulation of valve 12, be permitted to flow in regulated quantity through the pipe 13 into the top of fractionating column 7 and thence downward over bubble trays 8. The liquid which will then be caused to flow downward over bubble trays 8 will contact the vapor rising through these bubble trays and will condense thereon a portion of such vapors. The quantity of liquid caused to flow through pipe 13 into the top of fractionating column 7 will be so regulated as to condense within fractionating column 7 all of the vapors of lubricating oil which will rise therethrough and the condensate so produced will flow downward through fractionating column 7 over bubble trays 8. A pipe 14 in which is mounted a valve 15 is connected into fractionating column 7 immediately over an intermediate one of bubble trays 8 and if it is so desired a fraction of the material flowing downward over bubble trays 8 may be withdrawn from the fractionating column 7 therethrough and through a cooling device which is not shown. Liquid which will flow downward through fractionating column 7 will be withdrawn from the lowest of bubble trays 8 through a pipe 16 into a pump 17. The material which will be thus delivered to pump 17 will be forced thereby through the tube 18 which passes through the furnace 4 and delivers into the lower portion of fractionating column 7 under bubble trays 8. The material thus passed through the tube 18 will be heated therein and partially vaporized and the vapors thus formed will flow upward through fractionating column 7. Liquid delivered through tube 18 will collect in the bottom of fractionating column 7. Liquid delivered through tube 3 into separator 5 will flow thence through pipe 19 to a pump 20 and will be forced thereby through a tube 21 which passes through furnace 4 and delivers into the lower portion of a fractionating column 22 at a point below bubble trays 23 which are disposed in fractionating column 22. The liquid which is passed through the tube 21 will be heated and partially vaporized therein and will be delivered therefrom in a partially vaporized state into the lower portion of fractionating column 22, and vapors thus delivered into fractionating column 22 will flow upward therethrough and through the bubble trays 23 and thence through a pipe 24 and through condenser 25 into accumulator tank 26. The vapors which flow through the pipe 24 and condenser 25 will be condensed therein and will flow into accumulator 26 in a liquid state. A portion of the liquid which thus flows into accumulator 26 will, by regulation of valve 27, be permitted to flow in regulated quantity through pipe 28 into the top of the fractionating column 22 and will flow thence downward through the fractionating column 22 and bubble trays 23, contacting vapors which flow upward through fractionating column 23, and will condense a portion of such vapors on the bubble trays 23. The quantity of liquid permitted to flow through the pipe 28 into the top of fractionating column 23 will be so regulated as to condense within the fractionating column 22 any desired part of the vapors which rise through fractionating column 22. The liquid condensate produced by such condensation of vapors within the fractionating column 22 will flow downward over bubble trays 23. A portion of the condensate which will flow downward over bubble trays 23 may be withdrawn from the fractionating column 22 by means of a pump 29 through a pipe 30 which is connected into fractionating column 22 immediately over an intermediate one of bubble trays 23. That portion of the liquid which will flow downward in fractionating column 22 which is not withdrawn through the pipe 30 will flow to the bottom of fractionating column 22. Liquid which will collect at the bottom of fractionating column 7 will be caused to flow by means of a pump 31 through a pipe 32 into the fractionating column 22 and onto one of bubble trays 23 which is intermediate between the bubble tray from which liquid may be drawn through pipe 30 and the lowest of bubble trays 23. A pipe 33 in which is mounted a pump 34 leads from the bottom of the fractionating column 22 through coolers, which are not shown, and will be utilized to withdraw from the bottom of fractionating column 22 liquids which will collect therein. A vacuum pump 35, preferably of the steam jet type, which is mounted in pipe 36 which leads from the top of accumulator 26 will be utilized to maintain a high vacuum in the accumulator 26, the fractionating column 22, and interconnecting pipes. Valve 37 is mounted in a pipe 38 which leads from the top of accumulator tank 11. Although it is not necessary to the successful operation of the process, an absolute pressure of preferably from one to four atmospheres will be maintained in the accumulator 11, the fractionating column 7, and interconnecting pipes. A supply of hydrocarbon gas will be made available for delivery through the pipe 38 into the accumulator 11 for the purpose of maintaining pressure in the accumulator 11 if such supply of gas should in any particular case be found necessary for the purpose outlined. In case excessive pressure should develop in accumulator 11 gas may be vented therefrom through pipe 38. As a result of the maintenance of comparatively high pressure in the fractionating column 7 and comparatively low pressure in the fractionating column 22 the liquid which will be delivered from the bottom of fractionating column 7 through the pipe 32 into fractionating column 22 will in substantial amount vaporize upon entry into fractionating column 22. The extent to which liquids which will be passed through the furnace 4 will be heated and the introduction of refluxed liquid into the tops of fractionating columns 7 and 22 will all be so regulated that desirable fractions of the material delivered by the pump 2 to the process may be separated into desirable fractions. For instance, when charging a mixture of lubricating oil and naphtha to the apparatus, the apparatus may be so regulated in accordance with conventional practice as to permit the withdrawal of a naphtha fraction from the accumulator 11, a distillate fraction through the pipe 14, a light neutral lubricating oil fraction from the accumulator 26, a heavy neutral lubricating oil fraction through the pipe 30, and a bright stock fraction through the pipe 33. A pipe 39 in which is mounted a valve 40 is connected into the lower portion of accumulator 11 and will serve to withdraw from the accumulator 11 liquid which will collect therein. A pump 41 which is mounted in a pipe 42 which is connected into accumulator 26 will serve to withdraw liquid which will collect in accumulator 26. Steam may if desirable be admitted into tubes 18, 21, and 3 through pipes 43, 44, and 45, respectively. Valves 50, 51, and 52 are mounted in pipes 43, 44, and 45, respectively. In case steam is admitted into any part of the apparatus it will ultimately be condensed and delivered in the liquid phase into accumulators 11 or 26, as the case may be, and pipes 46 and 48 in which are mounted valve 44 and pump 49, respectively, are provided for withdrawing water from these accumulators.

While I have described in detail the use of one form of apparatus with which my new process may be carried out, it should be understood that I do not propose to limit myself to these details but intend to claim broadly all the inherent advantages of my new improvements. For instance, both of the fractionating columns shown may be operated at atmospheric pressure or at any other pressure and any mixture of liquids may be charged to the apparatus and separated into any desirable fractions. While the heating tubes 3, 18, and 21 are shown mounted in a single furnace, it may be found advantageous to mount these heating tubes in separately fired furnaces and I may do so.

I claim:

1. The process for fractionally distilling hydrocarbon oils comprising passing a mixture consisting of lubricating oil stock admixed with a lighter diluent oil, such as naphtha, in a restricted stream through a heating zone and thereby heating the mixture to a distilling temperature, separating the heated mixture under the influence of the heat impounded therein into a first liquid fraction and a first vapor fraction, rectifying said first vapor fraction under super-atmospheric pressure, thereby separating a second vapor fraction from a second liquid fraction, additionally heating said first liquid fraction and then simultaneously rectifying said first and second liquid fractions in a single rectifying zone under sub-atmospheric pressure.

2. The process for fractionally distilling lubricating oils comprising passing a mixture consisting of lubricating oil stock admixed with a lighter diluent oil, such as naphtha, in a restricted stream through a heating zone and thereby heating the mixture to a distilling temperature, then discharging the heated mixture into a separating zone, dividing said mixture in the separating zone into a first vaporous fraction and a first liquid fraction under the influence of the heat impounded therein, introducing said vaporous fraction into the medial portion of a first rectification zone and therein separating the same into a second liquid fraction and a second vaporous fraction, withdrawing a portion of the second liquid fraction and introducing it into the medial portion of a second rectification zone maintained under sub-atmospheric pressure and at a pressure below that existing in the first rectification zone, passing the first liquid fraction from said separating zone, reheating it and introducing it into the lower portion of the second rectification zone, subjecting the oil in each of said rectification zones to reflux condensation and thereby separating distillates from the oil, withdrawing a light distillate from the first rectification zone, and withdrawing heavier distillates from the second rectification zone.

3. The process for fractionally distilling lubricating oils comprising passing a mixture consisting of lubricating oil stock admixed with a lighter diluent oil, such as naphtha, in a restricted stream through a heating zone and thereby heating the mixture to a distilling temperature, then discharging the heated mixture into a separating zone, dividing said mixture in the separating zone into a first vaporous fraction and a first liquid fraction under the influence of the heat impounded therein, introducing said vaporous fraction into the medial portion of a first rectification zone and therein separating the same into a second liquid fraction and a second vaporous fraction, withdrawing a portion of the second liquid fraction from the lower portion of the first rectification zone, reheating it and returning it to the bottom portion of the first rectification zone for supplying heat to the bottom portion of the first rectification zone, withdrawing another portion of the second liquid fraction and introducing it into the medial portion of a second rectification zone maintained under sub-atmospheric pressure and at a pressure below that existing in the first rectification zone, passing the first liquid fraction from said separating zone, reheating it and introducing it into the lower portion of the second rectification zone, subjecting the oil in each of said rectification zones to reflux condensation and thereby separating distillates from the oil, withdrawing a light distillate from the first rectification zone, and withdrawing heavier distillates from the second rectification zone.

4. The process for fractionally distilling lubricating oils comprising passing a mixture consisting of lubricating oil stock admixed with a lighter diluent oil, such as naphtha, in a restricted stream through a heating zone and thereby heating the mixture to a distilling temperature, then discharging the heated mixture into a separating zone, dividing said mixture in the separating zone under the influence of the heat impounded therein, into a first vaporous fraction containing said lighter diluent oil, and a first liquid fraction, introducing said vaporous fraction into the medial portion of a first rectifying zone and therein separating the same into a second liquid fraction and a second vaporous fraction, supplying heat to the bottom portion of the first rectification zone, withdrawing a portion of the second liquid fraction from the lower portion of the first rectification zone and introducing it directly into the medial portion of a second rectification zone maintained under sub-atmospheric pressure and at a pressure below that existing in the first rectification zone, passing the first liquid fraction from said separating zone, reheating it and introducing it into the lower portion of the second rectification zone, subjecting the oil in each of said rectification zones to reflux condensation and thereby separating distillates from the oil, withdrawing lighter diluent oil from the upper portion of the first rectification zone, and withdrawing heavier distillates from the first and second rectification zone below the upper ends of said rectification zones.

5. The process for fractionally distilling lubricating oils comprising passing lubricating oil stock admixed with a lighter diluent oil, such as naphtha, in a restricted stream through a heating zone and thereby heating the mixture to a distilling temperature, then discharging the heated mixture into a separating zone, dividing said mixture in the separating zone into a first vaporous fraction and a first liquid fraction, introducing said vaporous fraction into the medial portion of a first rectification zone and therein separating the same into a second liquid fraction and a second vaporous fraction, withdrawing a portion of the second liquid fraction from the lower portion of the first rectification zone, reheating it and returning it to the bottom portion of the first rectification zone for supplying heat to the bottom portion of the first rectification zone, withdrawing another portion of the second liquid fraction and introducing it into the medial portion of a second rectification zone maintained under sub-atmospheric pressure and at a pressure below that existing in the first rectification zone, passing the first liquid fraction from said separating zone, reheating it and introducing it into the lower portion of the second rectification zone, subjecting the oil in each of said rectification zones to reflux condensation and thereby separating distillates from the oil, withdrawing a light distillate from the first rectification zone, withdrawing heavier distillates from the second rectification zone, and admixing steam with the first liquid fraction before introducing that fraction into the second rectification zone.

6. The process for fractionally distilling lubricating oils comprising passing lubricating oil stock admixed with a lighter diluent oil, such as naphtha, in a restricted stream through a heating zone and thereby heating the mixture to a distilling temperature, then discharging the heated mixture into a separating zone, dividing said mixture in the separating zone into a first vaporous fraction and a first liquid fraction, introducing said vaporous fraction into the medial portion of a first rectification zone and therein separating the same into a second liquid fraction and a second vaporous fraction, withdrawing a portion of the second liquid fraction from the lower portion of the first rectification zone, reheating it and returning it to the bottom portion of the first rectification zone for supplying heat to the bottom portion of the first rectification zone, withdrawing another portion of the second liquid fraction and introducing it into the medial portion of a second rectification zone maintained under sub-atmospheric pressure and at a pressure below that existing in the first rectification zone, passing the first liquid fraction from said separating zone, reheating it and introducing it into the lower portion of the second rectification zone, subjecting the oil in each of said rectification zones to reflux condensation and thereby separating distillates from the oil, withdrawing a light distillate from the first rectification zone, withdrawing heavier distillates from the second rectification zone, and admixing steam with the charging stock before passing the charging stock through the heating zone.

7. The process for fractionally distilling lubricating oils comprising passing lubricating oil stock admixed with a lighter diluent oil, such as naphtha, in a restricted stream through a heating zone and thereby heating the mixture to a distilling temperature, then discharging the heated mixture into a separating zone, dividing said mixture in the separating zone into a first vaporous fraction and a first liquid fraction, introducing said vaporous fraction into the medial portion of a first rectification zone and therein separating the same into a second liquid fraction and a second vaporous fraction, withdrawing a portion of the second liquid fraction from the lower portion of the first rectification zone, reheating it and returning it to the bottom portion of the first rectification zone for supplying heat to the bottom portion of the first rectification zone, withdrawing another portion of the second liquid fraction and introducing it into the medial portion of a second rectification zone maintained under sub-atmospheric pressure and at a pressure below that existing in the first rectification zone, passing the first liquid fraction from said separating zone, reheating it and introducing it into the lower portion of the second rectification zone, subjecting the oil in each of said rectification zones to reflux condensation and thereby separating distillates from the oil, withdrawing a light distillate from the first rectification zone, withdrawing heavier distillates from the second rectification zone, and admixing steam with the second liquid fraction after it leaves the first rectification zone and before it enters the second rectification zone.

8. A hydrocarbon oil distilling process which comprises passing lubricating oil stock admixed with a lighter diluent oil in a restricted stream through a heating zone and heating the same therein, to a distillation temperature under super-atmospheric pressure, discharging the heated mixture into a vapor separating zone and separating the same therein under super-atmospheric pressure into vapors and unvaporized oil, passing said vapors into a medial portion of a first rectifying zone also maintained under super-atmospheric pressure, rectifying said vapors in said rectifying zone and thereby obtaining a first vapor fraction and a first liquid fraction, passing at least a part of said first liquid fraction directly from the bottom portion of the first rectifying zone into a medial portion of a second rectifying zone maintained under sub-atmospheric pressure, passing unvaporized oil from the vapor separating zone, heating it and introducing it into the second rectifying zone at a point below that at which said first liquid fraction is introduced into the second rectifying zone, supplying heat to the bottom portion of the first rectifying zone, subjecting the oil in each of said rectification zones to reflux condensation and thereby separating distillates from the oil, withdrawing a light distillate from the first rectification zone, and withdrawing heavier distillates at different elevations from the second rectification zone.

MALCOLM P. YOUKER.